3,385,826
PROCESS FOR PREPARING TRIOXANE
HOMO- AND COPOLYMERS
Hans-Dieter Hermann and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 6, 1965, Ser. No. 469,883
Claims priority, application Germany, July 8, 1964, F 43,369
1 Claim. (Cl. 260—67)

ABSTRACT OF THE DISCLOSURE

A process has been provided for improved control of properties of homopolymers and copolymers of trioxanes. The improvement is achieved by incorporating with the reactants as a polymerization control agent a boric acid ester of the formula $B(OR)_3$ wherein R is an alkyl radical of 1 to 20 carbon atoms, a cycloalkyl radical of 5 to 6 carbon atoms, and aryl radical of 6 to 14 carbon atoms.

---

The present invention relates to a process for preparing homo- and copolymers of trioxane.

Polymethylenes made from trioxane or tiroxane-containing monomer mixtures and used for the manufacture of shaped articles, such as tubes, profiles, bottles, foils and extrusion moulded articles must have a very definite melt viscosity. It is advantageous to adjust the said melt viscosity during polymerization. It is possible, for example, to modify the melt viscosity by variation of the polymerization temperature or of the catalyst concentration. In either case, however, the polymerization rate and the degree of conversion are affected to an extent such that it is very difficult to perform the polymerization on an industrial scale. It is more favorable to add in the polymerization water, alcohols or certain —C—O—C— compounds, for example ethers or acetals, as controlling or regulating agents. These compounds act as chain interrupting agents and simultaneously form a second polymer chain (transfer reaction). Unfortunately, many of the known controlling agents reduce the polymerization rate or the degree of conversion. Others, such as the ethers or esters, are little active so that high concentrations thereof must be used.

It has now been found that the polymerization and copolymerization of trioxane can be controlled in an advantageous manner when boric acid esters of the general formula $$B(OR)_3$$

in which R stands for alkyl radicals with 1 to 20 carbon atoms, cycloalkyl radicals with 5 to 6 carbon atoms and aryl radicals with 6 to 14 carbon atoms, are used so controlling agents.

Suitable esters of boric acid are, for example, the trimethyl, triethyl, tripropyl, triisobutyl or stearyl ester; furthermore aromatic or cycloaliphatic esters such as triphenyl and tricyclohexyl borate. Boric acid esters are very active, that is to say they react practically quantitatively with the polymerizing trioxane. In this reaction stable terminal groups are transferred to the polymer, which are not split off when the polymer is subjected to a further treament or worked up. This fact is rather surprising since carboxylic acid esters only have a minor controlling effect and transfer to the polymer stable terminal groups only partially. Moreover, boric acid esters have the advantage that they practically do not affect the course of polymerization as regards the polymerization speed and the degree of conversion. Still further, boric acid esters can be stored in the presence of oxygen, whereas ethers and acetals readily form peroxides which impair the stability of the controlled polymers.

The boric acid esters can be used in all polymerizations in which trioxane is used as component, for example in the homopolymerization of trioxane as well as in the copolymerization of trioxane with other monomers. Suitable monomers in the copolymerization are, for example, cyclic ethers of the general formula:

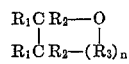

in which $R_1$ and $R_2$ stand for hydrogen or low molecular weight alkyl radicals or low molecular weight halo-substituted alkyl radicals and $R_3$ represents a methylene or oxymethylene group, a methylene group substituted by a low molecular weight alkyl radical or halo-alkyl radical, or an oxymethylene group substituted by a low molecular weight alkyl radical or haloalkyl radical, and $n$ is 0, 1, 2 or 3, such as epichlorohydrin, ethylene oxide, 1,3-dioxolane, diethylene glycol formal, 1,4-butane-diol formal, 1,3-dioxane, 4-phenyldioxolane, propylene oxide, phenoxy-propylene oxide; furthermore cyclic esters such as β-propiolactone, and vinyl compounds such as styrene or acrylonitrile.

The said monomers are copolymerized with trioxane preferably in a proportion of 1 to 50% by weight, calculated on the trioxane.

The concentration of the boric acid esters to be used depends on the desired melt index and on the purity of the monomers to be polymerized. With increasing amounts of boric acid ester and molecular weight and, consequently, the melt viscosity of the polymers decrease, while the concentration of the stable terminal groups increases. Very pure monomers require a higher amount of controlling agent than contaminated monomers, however, the former yield more stable polymers.

In general, the controlling agents are used in an amount of 0.001 to 5% by weight, preferably 0.001 to 0.5% by weight, calculated on the monomers.

As regards all other polymerization or copolymerization conditions, the conditions known for trioxane may be applied, that is to say the known cationic catalysts can be used, for example acids and Lewis acids, the same catalysts concentrations can be applied, for example in the range of from 0.001 to 1%, and the same temperatures, depending on the process carried out, in the range of from —50° C. to +100° C.

Suitable catalysts are, for example, inorganic acids such as sulfuric acid or perchloric acid, acid halides such as sulfuryl chloride, and particularly Lewis acids, such as the chlorides and fluorides of boron, beryllium, aluminium, titanium, iron, tin, antimony, and zinc, as well as the complex compounds thereof (as to the definition of Lewis acids cf. Kortüm, Lehrbuch der Elektrochemie, Wiesbaden (1948), pp. 300–301). The catalysts mentioned in British Patent 943,684 are especially suitable.

The polymerization can be carried out according to known methods. The polymerization of trioxane in the melt at a temperature of 60 to 90° C. is preferred. However, the polymerization may likewise be caried out in solution, in suspension or in the solid state, occasionally under the action of ionizing radiation.

As solvents there can be used chlorohydrocarbons, such as carbon tetrachloride, methylene chloride, chloroform, chlorobenzene, and nitro compounds such as nitromethane and nitrobenzene.

In most cases it is advisable to subject the polymers to a customary after treatment and stabilization. It is recommended to neutralize the catalyst after the polymerization. Unstable polymer portions which may still be present can be removed by a known thermal and/or alkaline aftertreatment. Owing to the fact that the controlling agents to be used according to the invention transfer stable terminal groups to the polymers, the polymers according to the invention have a lower proportion of unstable polymer than trioxane polymers prepared according to a conventional process.

After having been stabilized with known stabilizers, for example oxidation stabilizers, such as bisphenols, and thermostabilizers, such as amides and amidines, the polymers are well suitable for being processed on extrusion or injection moulding machines.

The reduction of the molecular weight brought about by controlling the polymerization involves a lowering of the viscosity of the melts and the solutions of the polymers. As a measurement of the melt viscosity is used the melt index $i_2$ determined at 190° C. under a load of 2.16 kg. according to ASTM D–1238. The viscosity of the solutions was measured by determining the reduced specific viscosity $\eta sp/c$ of a solution of 0.5 g. of polymer in 100 cc. of a 2% solution of diphenyl amine in butyrolactone at 140° C.

The following examples serve to illustrate the invention, but they are not intended to limit it thereto.

Example 1 and comparative examples

Each time 100 grams of trioxane were admixed, with the exclusion of humidity and at 70° C., with 1.5 millimoles of the controlling agents indicated in the table below. Polymerization was then initiated by adding to each mixture 0.01 gram of p-nitrophenyl-diazonium-fluoborate. After having been kept for one hour at 70° C., the polymer samples were comminuted and boiled in methanol in the presence of 1% of triethyl amine. The unstable portions were determined by heating for 30 minutes a 10% solution of the respective polymer in benzyl alcohol containing 1% of triethanol amine. By this treatment the unstable polymer portions were completely decomposed. The following table reveals that in comparison with other known controlling agents, boric acid trimethyl ester provokes a greater reduction of the viscosity of the polymer and that the polymers containing it contain a lower unstable portion.

| Controlling agent | $\eta_r = \frac{\eta sp}{c}$ (dl./g.) | Unstable portion (percent by weight) |
|---|---|---|
| H₂O | 1.46 | 74 |
| CH₃OH | 0.72 | 81 |
| CH₃O—CH₂—OCH₃ | 0.70 | 71 |
| B(OCH₃)₃ | 0.70 | 65 |
|  | 0.60 | 60 |

Example 2

Trioxane was polymerized at 80° C. using as catalyst 0.015% by weight of p-nitrophenyl-diazonium fluoborate. In the absence of a controlling agent the polymer had a reduced viscosity of 1.02. The addition of 0.05% of triethyl borate reduced the viscosity to 0.52, 0.1% by weight to 0.39.

Example 3

A solution of 2% by weight of ethylene oxide in trioxane was polymerized at 65° C., using as catalyst 2 cc. of gaseous BF₃ (1:10, diluted with nitrogen). The melt index $i_2$ of the polymer was increased from 0.7 to 10.3 by the addition of 0.06% by weight of boric acid triphenyl ester.

Example 4

A copolymer was prepared from trioxane and 4% by weight of dioxolane using as polymerization catalyst 0.01% by weight of BF₃-dibutyl etherate and operating at 70° C. The product polymerized in the presence of 0.7% by weight of boric acid trimethyl ester had a reduced viscosity of 0.09 and contained a small proportion of unstable matter. As compared therewith, the copolymer prepared without the addition of a controlling agent had a reduced viscosity of 1.32.

We claim:

1. In the process for preparing trioxane homo- and copolymers by polymerizing trioxane and mixtures of trioxane with cyclic ethers at a temperature in the range of from −50° C. to +100° C., in the presence of 0.001 to 1% by weight of a cationic catalyst, in the presence or absence of a solvent, the improvement which comprises using as polymerization controlling agent as characterized by viscosity measurements 0.001 to 5% by weight, calculated on the monomers, of at least one boric acid ester of the general formula $$B(OR)_3$$

in which R stands for alkyl radicals with 1 to 20 carbon atoms, cycloalkyl radicals with 5 to 6 carbon atoms and aryl radicals with 6 to 14 carbon atoms.

References Cited

UNITED STATES PATENTS 3,252,938  5/1966  Richtzenhain et al.

OTHER REFERENCES

Kern et al., pp. 10–15 of the English Translation of Angewandte Chemie, 73 No. 6 (March 1961), pp. 177–186.

Yamashita et al., Chemical Abstracts, 60 No. 10 (May 11, 1964), pp. 12111 a–f.

WILLIAM H. SHORT, *Primary Examiner*.

L. M. PHYNES, *Assistant Examiner*.